UNITED STATES PATENT OFFICE.

ARCHIBALD CAMPBELL PONTON, OF BEDFORD, ENGLAND.

FIRE-BRICK AND PROCESS OF MAKING SAME.

SPECIFICATION forming part of Letters Patent No. 627,443, dated June 20, 1899.

Application filed September 23, 1897. Serial No. 652,775. (Specimens.)

*To all whom it may concern:*

Be it known that I, ARCHIBALD CAMPBELL PONTON, architect, a subject of the Queen of Great Britain, and a resident of 45 Ashburnham road, Bedford, in the county of Bedford, England, have invented certain new and useful Improvements in Fire-Brick and other Fireproof Goods and in the Mortar to be Used in Conjunction Therewith, of which the following is a specification.

This invention relates to the production of a highly refractory and practically pure silicious material in such a state of aggregation as to be suitable for the manufacture of fire-bricks, crucibles, or other fireproof goods, and of fireproof mortar or cement, especially for use where great resistance to high temperature is necessary.

It is already known that a natural or artificial mass of pure silica is very refractory, and it has been ascertained that neither natural pure silica nor artificial pure silica as heretofore made is suitable for fire-bricks or other fireproof goods or cement, owing to its liability to splinter or disintegrate under the influence of great heat, especially of a more or less intermittent character. Owing to this fact all so-called "silica" fire-bricks or other fireproof goods hitherto made have been composed of silica in combination with one or more bases—such as alumina, iron, lime, or magnesia—so that permanent silicates are formed having a lower melting-point than that of pure silica, both the chemical and physical properties of the pure silica being thus destroyed, and the said base or bases acting as a flux cause the fireproof goods to fuse and form slag under the influence of a high temperature—such, for instance, as 2,600° Celsius—whereas pure silica has the very high melting-point of 3,000° Celsius or thereabout.

Now the object of my invention is to produce fire-bricks and other fireproof goods and mortar or cement of practically pure silica in such a state of aggregation that while retaining the highly refractory property of the pure silica it shall not be liable either to fuse and produce slag or to splinter and disintegrate under the influence of even long continued and very intense heat, such as is required for the manufacture of steel or other substances requiring a very high temperature that may be more or less of an intermittent character.

In carrying my invention into practical effect I take pure powdered silica derived in any suitable manner from any convenient form of pure silica, such as flint, chalcedony, opal, agate, or quartz, reduced to powder by any known and convenient method. I bring this silicious powder to a plastic state by mixing it with a weak solution of silicate of soda, silicate of potash, or other alkaline silicate, or of two or more of these combined, the proportion of the alkali (measured in the dry state) being from two to three per cent., by weight, of the total amount of the silica, (also measured in the dry state.) To this mixture of powdered silica and alkaline silicate I now add and thoroughly mix therewith materials of a combustible nature, such as heath, hay, straw, jute, cocoanut fiber, or other suitable carbonaceous substance or substances cut into the size of ordinary chaff and used either singly or two or more combined and in the proportion of from twenty-five to fifty parts, by volume, of combustible matter, to one hundred parts, by volume, of dry powdered silica, or I may add in addition to such chaff or replace such chaff by larger combustible carbonaceous material, such as bulrushes, twigs of trees, reeds, wood, coke, or charcoal, either separately or combined and broken or cut to about the size of hazel-nuts. This larger combustible carbonaceous material is employed in the manufacture of fire-bricks and larger masses of fireproof goods and omitted in the manufacture of smaller fireproof goods. When the larger combustible carbonaceous material is used, the total proportion of carbonaceous material to dry powdered silica is from fifty to one hundred per cent. by volume. After the above materials have been intimately mixed by any convenient method and to the required degree of plasticity I form the substance into any required shape of bricks, crucibles, or other fireproof goods by any of the known methods and then dry and subsequently burn the latter at a very high temperature in any suitable kiln, the degree of heat used and the time during which this heat is applied being sufficient to completely volatilize and drive off the alkaline base or bases and also the carbonaceous combustible material, thus leaving the silica behind in a practically pure state, strongly consolidated by a process of incipient fusion and crystallization, the finished product having the same melting-point as quartz. Thus the alkaline base or bases having been volatilized and driven off, so that none remains in the finished product to act as a flux, the practically pure silica of which these fireproof goods are composed will not fuse and form slag, even at the very high temperatures now produced by the Siemens regenerative gas-furnaces in the manufacture of steel. The combustible carbonaceous material or materials first serve to bind the mass of the substance together, and during the process of burning they are driven off in the form of gas and steam, leaving the fire-brick or other finished product in a more or less vesicular or cellular state, the said finished product having throughout the mass of its substance a number of interstitial spaces varying in number and size, according to the quantity and size of the pieces of carbonaceous combustible material used. It is due to this said vesicular or cellular state that the splintering or fracture of the fire-bricks or other finished product under the influence of great heat of the nature now employed for manufacturing purposes is more or less obviated, the greater the proportion of interstitial spaces in the finished product the less being the liability to fracture.

I do not rigidly confine myself to any particular proportions and quantities of the various materials hereinbefore mentioned, as it will be obvious to any person conversant with this class of manufacture that such proportions and quantities will necessarily vary, according to the degree of vesiculation or porosity required in the finished product and also upon the nature of the combustible carbonaceous material used. The finished fireproof goods, however, must always have an apparent density or specific gravity varying from 0.5 through all degrees of density up to 1.5; but above this latter point I find that the density of the silicious structure is too great to resist the influence of sudden heat of the temperature required without fracture and therefore unsuitable for the end in view. The greater the proportion of combustible carbonaceous substance and water employed the lower will be the apparent density of the resultant product, a fire-brick with a specific gravity of 1.15 having about fifty per cent. of its volume occupied by interstitial spaces.

I may employ in one article—such, for example, as a crucible—varying densities throughout the structure with great advantage, the outside and inside of such crucible being made more vesicular than the center core, by this means greater strength being given to the whole crucible.

For purposes of finishing with a smooth coat I may add to the mixture of powdered silica and alkaline silicate (mixed in the proportions hereinbefore described) sufficient water to bring the mixture to a fluid or semifluid state; but I now omit the carbonaceous combustible material. This silicious fluid or semifluid I may employ to coat any of the finished products made according to this invention requiring the same. When, for example, it is required to coat the inside of a crucible, I fill such crucible with the silicious fluid or semifluid and then pour off all superfluous fluid or semifluid again. When the crucible is now strongly heated, (owing to the thinness and fluidity of the silicious coating,) a thin coat of great smoothness will be produced on the inside thereof not liable to crack. A similar coat may be applied with success to any other finished product made according to this invention, provided the coating of silicious substance is always sufficiently fluid and thin.

The two following are examples of convenient quantities of materials to employ for making fireproof goods according to my invention:

First. For a finished product having about sixty per cent. interstitial spaces and a specific gravity of about 0.92 I use to produce one thousand bricks (British size) about two tons of powdered silica, twenty-four gallons silicate of soda or other suitable flux, one hundred and seventy-six gallons of water, and four hundred pounds of carbonaceous combustible material.

Second. For a finished product having seventy per cent. interstitial spaces and the specific gravity of about 0.69 I use to produce one thousand bricks (British size) about one and one-half tons powdered silica, eighteen gallons silicate of soda or other suitable flux, one hundred and eighty-two gallons of water, and six hundred pounds carbonaceous combustible material.

What I claim is—

1. The herein-described material for firebricks, crucibles and the like consisting in the finished products of crystals of chemically-pure silica held together by a bond of tridymite and of a vesicular or porous nature, substantially as described.

2. The herein-described process of making fireproof articles consisting in mixing chemically-pure silica in the form of an impalpable powder, whose particles have an average diameter of one ten-thousandth of an inch with a much coarser divided carbonaceous material such as ordinary cut chaff or coarseground clean coke or the like, then adding an alkaline silicate until the desired consistency is obtained, and then subjecting the product to a heat exceeding 1,400° Celsius thereby burning and driving off the alkali and carbonaceous materials, crystallizing all the silica and binding the crystals together by tridymite, substantially as described.

3. The herein-described process of making fireproof articles consisting in mixing chemically-pure silica in the form of an impalpable powder, whose particles have an average diameter of one ten-thousandth of an inch, with an alkaline silicate and a carbonaceous material, subjecting such articles to heat exceeding 1,400° Celsius, finally coating such articles with a mixture of powdered silica, an alkaline silicate and water, and again heating the articles, substantially as described.

In witness whereof I have hereunto set my hand in presence of two witnesses.

ARCHIBALD CAMPBELL PONTON.

Witnesses:
ERNEST MUNRO PONTON,
RUPERT PONTON.